United States Patent

[11] 3,595,412

[72] Inventors Raymond L. Billingsley
Detroit, Mich.;
Ralph L. Howard, Pittsburgh; Donald H. Noreen, Pittsburgh, Pa.
[21] Appl. No. 706,289
[22] Filed Feb. 19, 1968
[45] Patented July 27, 1971
[73] Assignee Westinghouse Electric Corporation
Pittsburgh, Pa.

[54] METHOD OF CONTROLLING A MATERIAL STORAGE & RETRIEVAL MEANS IN A WAREHOUSE SYSTEM
14 Claims, 6 Drawing Figs.

[52] U.S. Cl. .................................................. 214/152, 214/16.4
[51] Int. Cl. ................................................... B65g 1/06
[50] Field of Search ........................................ 214/16.4, 16.42, 16.14 P, 152

[56] References Cited
UNITED STATES PATENTS
| | | | |
|---|---|---|---|
| 2,988,237 | 6/1961 | Devol | 214/11 |
| 3,049,247 | 8/1962 | Lemelson | 214/16.42 |
| 3,148,785 | 9/1964 | Fauconnier | 214/16.14 D |
| 3,297,379 | 1/1967 | Artaud et al. | 214/16.42 X |

Primary Examiner—Gerald M. Forlenza
Assistant Examiner—Raymond B. Johnson
Attorneys—F. H. Henson and R. G. Brodahl ABSTRACT: An automatic large-scale warehousing system including a warehouse with a large number (8,100) of bins (B) arrayed in aisles AS for storing enough products (17,000) to service a complex of manufacturing plants (26 automobile assembly plants). A crane CR is associated with each aisle and is actuable to store or retrieve the material in the different bins B. A Computer (FIG. 6) is associated with this system of bins and part of the memory core (Inventory Core) of the computer carries an inventory of the storage; that is, an identification of each bin and the material stored in this bin. The core of the Computer is also programmed so that in response to selective commands on punchcards, the cranes are automatically actuated either to store material in open bins, identified in the Computer as open, or to retrieve material from the bins where they are stored. The Inventory Core of the Computer is automatically changed to record each storage and each retrieval. The Inventory Core of the Computer has facilities for storing the condition of each bin (8,100) and can store data identifying the bin position of any of the (17,000) products. The complete warehousing is carried out by the cooperation of the Computer and the bin system and not by operation of wired logic associated with different sets of bins.

METHOD OF CONTROLLING A MATERIAL STORAGE & RETRIEVAL MEANS IN A WAREHOUSE SYSTEM

BACKGROUND OF THE INVENTION

This invention relates to warehousing or the storage and retrieval of materials and has particular relationship to large-scale warehousing of materials for large mass production industries, typified by the automobile industry. Typically, this invention concerns itself with the warehousing demanded by automobile assembly plants. There may be 20 or 30 such plants in a vicinity which are serviced by a single warehouse. In such a warehouse it is necessary to store an enormous number of separate materials and parts; in a typical situation there may be in excess of 17,000 parts. From such a warehouse it is necessary to efficiently and reliably retrieve the stored material so that the assembly plants can remain in uninterrupted operation. The rates at which automobiles are produce in an assembly plant imposes as an indispensable condition that the storage of material in, and retrieval of material from, the warehouse shall be as fully automatic as practicable, but whatever automatic operation there is must be reliable and not subject to long-term shutdowns because of failure of a mechanism or part. It is an object of this invention to provide a large-scale automatically operating warehouse which shall be capable of supplying parts and materials to a large number of mass-producing plants at the high rate demanded by such plants without being subject to long term shutdowns through maloperation and failures of different types.

In accordance with the teachings of the prior art large-scale warehousing of the type under consideration is carried out, aisle by aisle. Typically, in such prior art apparatus each aisle and its crane is wired separately for separate operation by an operator. The information as to the identification and position of material is stored, for example, in a computer for future use. When material is stored the operator approaches an aisle, dials or punches buttons for the crane. A solid-state logic system for the aisle is actuated and the associated crane picks up the load and deposits the material in a bin. The operator then transmits the information as to the storage directly or by punched card to the computer where it remains until it is retrieved. An operator who desires to retrieve material derives from this computer, its position in the warehouse. The operator then operates a dial or buttons for the aisle in which the material is stored actuating a solid-state logic system and a crane retrieves the material and brings it to him. The position and identification of the material is selected by the wired logic of each aisle.

One of the disadvantages of the prior art large-scale storage apparatus is that in this apparatus complete rewiring of the logic system is required for any change in the mode of operation. The steps which are performed when an operator actuates a dial or button are derived typically from solid-state controls identified with aisle and crane involved. If a different series of steps is desired the system including the pushbuttons and the controls must be rewired. Each different relationship between cranes and bins which it may be necessary to establish requires a rewiring of the wired logic of each aisle which is to be changed. The cost of operation and maintenance of the prior art large-scale warehousing is very high. The cost of "bookeeping" to maintain the inventory of such a prior art system is also high.

It is an object of this invention to overcome the difficulties and disadvantages of the prior art large-scale warehousing apparatus and processes and to provide a method of operating warehousing apparatus affording the utmost in reliability whose practice shall demand warehousing apparatus of relatively low cost, and whose cost of operation shall be reasonable.

SUMMARY OF THE INVENTION

In accordance with this invention a large-scale warehousing apparatus is provided including a central Computer having a memory typically in the form of a memory core. The Computer is capable of maintaining in its memory a record of each of the storage bins which identifies the material, if any, in filled bins and of the bins which are empty. In a typical situation there are 540 bins per aisle and there are 15 aisles. In this apparatus the computer has a memory, typically with a core or a core section capable of storing 8,100 words, each word identifying a bin and also the material, if any, stored in each bin. In addition, the Computer typically includes cores or core sections programmed to carry out the warehousing. Change in the warehousing procedure is effected by changing the programming of these cores.

Typically the memory core of the Computer includes a number of stacks, each stack having 4,096 words. In a typical situation there are five of these stacks which contain about 20,500 words. Two stacks, or about 8,100 words, are used for the Inventory Core of the program. The other three stacks or about 12,000 words are used for the programming.

The material to be stored is deposited in trucks, each truck carries a card identifying the material and truck number. At the start of a storing operation the operator deposits the truck on an input station for which it may be removed by a crane, and then actuates a pushbutton. If the truck is properly deposited on the input stations so that it can be removed by the crane, the data covering the truck is fed into a Search Program. This program periodically carries out a searching operation and sets the cranes through a Crane Control Program to operate with a predetermined priority depending on the positions of the different cranes. The truck on the station is picked up at a time dependent on the position of the crane corresponding to the station and the material retrieval commands which the crane is receiving. The retrieval and pickup schedule is such as to minimize the overall time of pickup and retrieval. Once the truck is picked up and deposited in a bin, a signal is transmitted to a Tape Impressing Mechanism which impresses the data including the truck number and the material in the truck and the bin in which it is deposited on the tape. The tape is fed into a Tape-To-Card-Converter which produces a retrieval card for each of the material records impressed on the tape. Once the truck is deposited in a bin the Inventory Core of the Computer is changed to include the truck number identification, material number and bin number which has been deposited in one of the word positions of the core.

In large-scale warehousing there is usually a demand for retrieval of a large number of materials. This demand is set by a Retrieval Card Reader in which there are a large number of cards at any time. Retrieval Card Reader transfers the data on a predetermined number of the cards which it has to a Retrieve Schedule Buffer. The data on a predetermined number of cards in this Schedule is transferred to the Search Program which controls the retrieval in accordance with the position of the cranes in the aisles in which the materials identified by the cards are stored. The Search Program periodically scans all the cards including the store cards as well as the retrieval cards in its tables and causes the cranes continually to carry out storage or retrieval operations in the most effective and least time-consuming manner. When data in the Search Program table has resulted in a retrieval operation, this data is removed from the table and is replaced by data in the Schedule which is in turn replaced by data from another card. All retrieval operations are recorded on the Record Tape by the Impressing Mechanism and the identifying data of a bin which has become empty is stored in the Inventory Core of the Computer.

To protect against any extended shutdown by reason of disabling or maloperation of any part of the apparatus the Computer is connected in trouble-diagnostic relationship with the Cranes. The Computer includes a Diagnostic Program which provides an indication on the occurrence of a maloperation of a crane or on the occurrence of a pickup which does not correspond to a card inserted in the Retrieval Card Reader either because the material is incorrect or because the bin in which the material is picked up is not the bin for which the Card Reader called. The Computer through its Diagnostic Program actuates an indicating mechanism which identifies the crane or the bin as to which the maloperation has occurred and a repair or correction of the error is promptly effected.

An important feature of the warehousing according to this invention is that it is directed towards assuring that the inventory of the warehouse is precisely maintained by the manner of cooperation of the Program of the Computer. Unless there is a complete correspondence between the store card inserted in the Storage Card Reader and the other data the Computer indicates that something is amiss. For example, if an operator places a truck on the Input Station for one of the aisles, inserts the card for this truck in the Storage Card Reader so that the data transmitted to the Computer are based on the aisle selected, and then inadvertently actuates the pushbutton for another aisle, the Computer shows by indicators that something is amiss. If the operation had been permitted to progress with another truck at the second Input Station, the other truck would be deposited in a bin of the second aisles but the Core would carry inventory of the other truck in the first selected aisle.

To achieve the precise warehousing demanded the impressing of the records by the Tape Impressing Mechanism and the transfer of data to the Inventory Core is carried out in the practice of this invention for completed operations and not when the signal to carry out an operations is first impressed. For example, when a crane is signalled to remove a truck from a bin and carries out this operation moving the truck into the aisle, the Tape Impressing Mechanism indicates only that the truck has been removed from the bin. The Tape Impressing Mechanism is impressed as soon as the truck is removed from the bin into the aisle and not after the truck has been moved entirely out of the aisle. If the impression were made after the truck has moved out of the aisle there would be no impression for a truck which has been moved into the aisle and which has not been moved out of the aisle because at this point the associated crane has failed. Under such circumstances there would be no impression on the tape indicating that the bin has been cleared and the status of the warehouse would not be correctly indicated on the bin or in the Inventory Core. Similarly there is no impression by the Tape Impressing Mechanism or record in the Inventory Core of a deposit in a bin until the deposit has actually taken place. The mere start of a crane movement by the Crane control Program is not indicated on the Tape or in the Core. If it were, and the crane failed on the way to the bin, there would be an incorrect impression on the Tape and in the Core.

BRIEF DESCRIPTION OF THE DRAWINGS

For a more complete understanding of this invention, both as to its organization and as to its method of operation, together with additional objects and advantages thereof, reference is made to the following description taken in connection with the following drawings, in which.

DETAILED DESCRIPTION OF INVENTION

Figure 1:
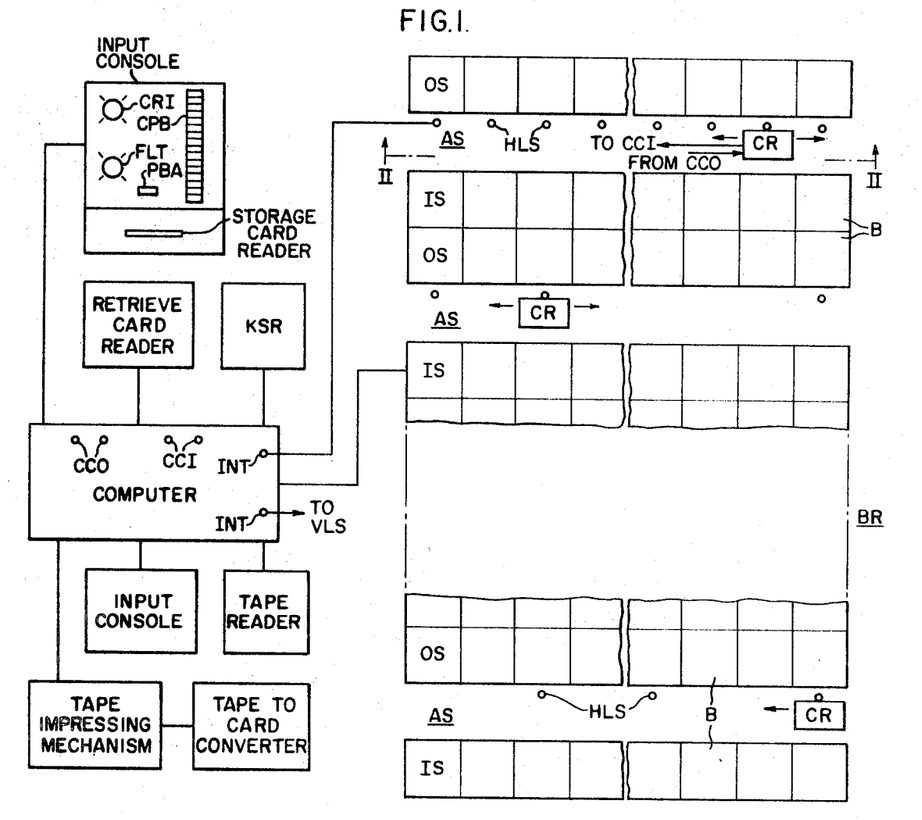
FIG. 1 is a diagrammatic plan view showing apparatus in which large-scale warehousing is carried out in the practice of this invention.
Figure 2:
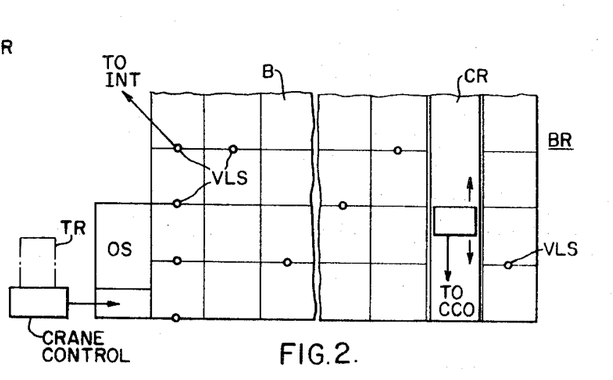
FIG. 2 is a view in section taken along line II–II of FIG. 1.

The apparatus shown in the drawings is a large-scale warehouse including a plurality of bin racks BR arrayed in aisles AS. The bins B in the racks are arrayed vertically and horizontally in columns and in rows respectively. A crane CR is actuable in storage and retrieval relationship with the bins B on both sides of each aisle AS. Each crane CR is movable horizontally and vertically along the aisle and may be set opposite any bin B in which it is to store material or from which it is to retrieve material. An Output Station OS is provided on one side of each aisle AS and an Input Station IS on the opposite side of each aisle. As shown in FIG. 1, the Output Station is to the left of the crane and the Input Station to the right of the crane.

The material to be stored is contained in trucks TR which are deposited on the Input Station IS or on the Output Station OS or in the bins B in such a way that the claws of the crane CR may penetrate under the truck TR and engage the truck in removal relationship or disengage the truck TR in deposit relationship. In picking up a truck for deposit or retrieval, the crane CR passes through a rectangular motion as diagrammed in FIG. 4; when a crane CR deposits a truck TR it passes through rectangular motion as diagrammed in FIG. 5.

Figures 4, 5, 6:
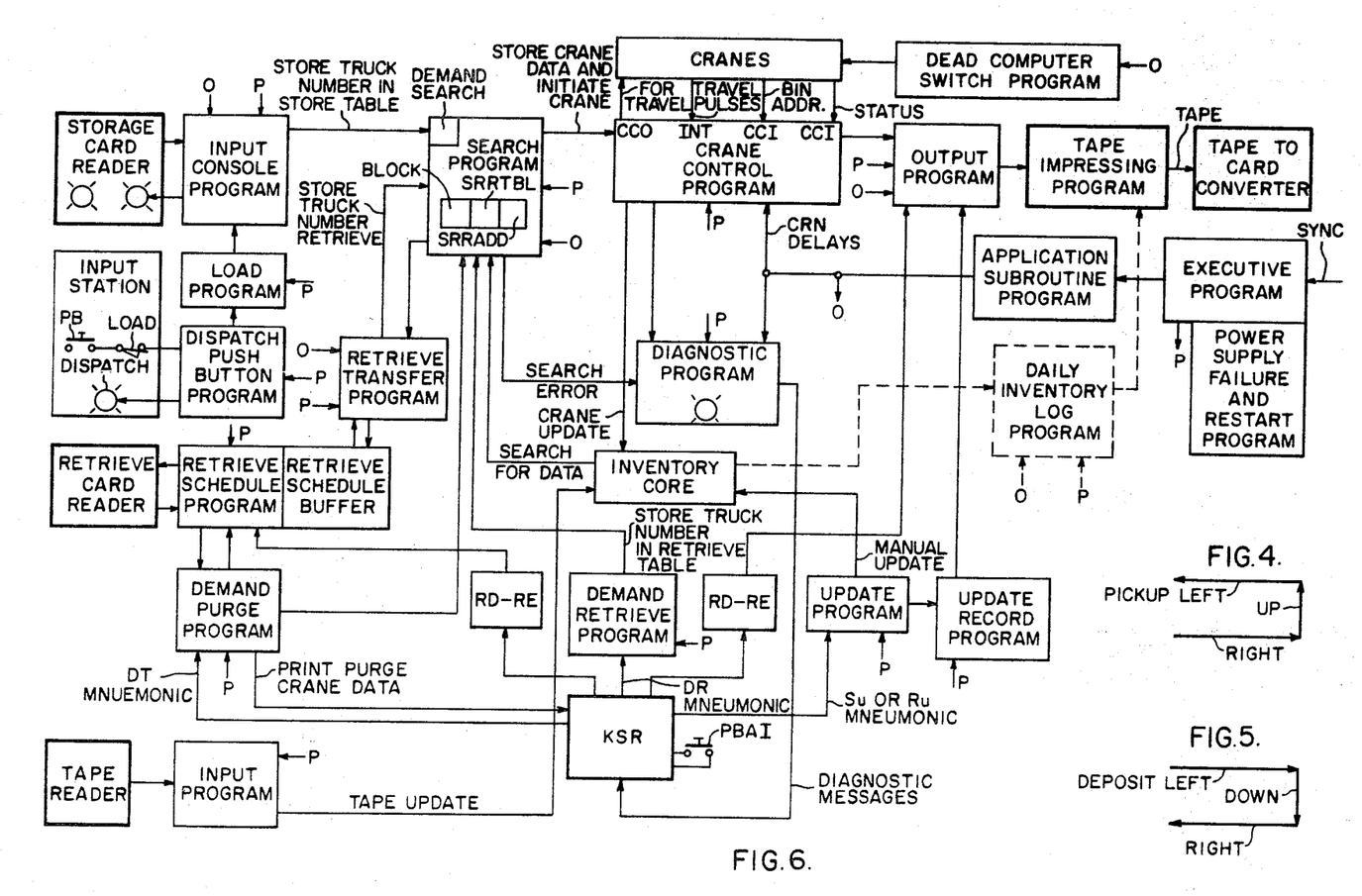
FIGS. 4 and 5 are diagrammatic views showing typical movement of the crane during deposit of a truck for storage or pickup of a truck containing material to be retrieved.
FIG. 6 is a diagrammatic view in block diagram showing the relationship between the computer and the other apparatus which is used in the practice of this invention.

Assume that a crane CR is to pick up a truck TR from an Input Station IS. The claws or tines of the crane CR move to the right under the base of the truck, then upwardly to engage the base and then raise the truck TR, then to the left to remove the truck TR. Like movement of the crane CR takes place when the crane is to remove a truck TR from a bin B on the right and corresponding movement, left-raise right for a crane in a bin on the left.

When a crane is to deposit a truck TR which it has picked up at an Input Station IS, it moves along the center of the aisle AS from the Station IS to the empty bin B in which the truck TR is to be deposited. If the bin B is on the right, the crane and the truck move into the bin B then the crane moves downwardly to disengage the claws from the base of the truck TR and deposit the truck, then to the left to the center of the aisle AS (FIG. 5). Corresponding movement to the left downwardly and to the right takes place when the empty bin which receives the truck is on the left.

The crane movement from point to point in each aisle AS includes horizontal forward or reverse and/or vertical hoist or lower functions. The forward and reverse and/or hoist and lower movements may take place simultaneously. The horizontal and vertical functions of each crane actuate limit switches HLS and VLS. Each time a column center (center of column of bins B) is passed a horizontal limit switch HLS is actuated and produces a signal which is received in the Computer as an interrupt signal. Each time a shelf level (vertically) is passed a vertical limit switch VLS is actuated and produces another interrupt signal. An interrupt signal has top priority and interrupts any Program which happens to be in process until it performs its function.

The crane drive (not shown) produces vertical movement of the crane CR at a constant rate throughout. But the horizontal movement is at a high rate until the crane moves the last increment between the next-to-assigned and the assigned bin. The cranes CR are moved over this increment at a low rate. When a crane CR carries out only a one-bin horizontal movement the Crane Control Program is set so that this crane moves at a high speed over part of the path and at low speed at the end of the path. After this movement is completed the Crane Control Program is reset so that the control for horizontal movement of the cranes CR is set to take place over a plurality of bins.

The Crane Control Program of the Computer calculates the required bin and shelf movement. The numbers are stored in a horizontal and vertical counter (not shown) respectively which are assigned to each crane. The actual motion is initiated after the counters are set.

As a crane CR moves the interrupt signals produced by the switches HLS or VLS are received. Each time the associated horizontal or vertical interrupt is impressed the horizontal counter is decremented or counted down by one. If the remaining count is then greater than one, this operation continues. When this remaining count equals one, the crane CR is one horizontal bin position away from where it is to be stopped. The high speed contact-closure output (CCO) of the Computer is reset, causing the horizontal movement to be slowed down. When the next horizontal interrupt occurs, the horizontal counter is decremented to zero and the appropriate Forward or Reverse contact closure output of the Computer is reset, causing the Crane to be stopped. Each time the associated vertical interrupt occurs the vertical counter is decremented. If the count does not equal zero the operation continues. If the count does equal zero the Hoist or Lower contact closure output (CCO) is reset. When horizontal and vertical movement takes place simultaneously the appropriate counting switches are actuated in the proper order.

The Program which accommodates the movement interrupts is entered directly by the interrupts and functions immediately. This is to insure the shortest possible reaction time to reset the movement contact closure outputs of the Computer.

When there are no further store or retrieve commands for a crane CR, it does not necessarily return to the home position, but it remains at its last position or is reset to a position within the aisle AS where it can most effectively carry out a succeeding operation. When the Crane Control Program is signalled by the Search Program that a crane is set for repositioning, the position of the crane CR in the aisle AS is checked. If the crane is within prescribed horizontal and vertical limits away from home so as to carry out a succeeding operation effectively no repositioning takes place. The Search Program subsequently signals that the crane is not busy and is free to do another Store or Retrieve operation. If the crane is not within the prescribed limits it is moved to predetermined horizontal and vertical positions (if both are required). When the movement is completed the Search Program subsequently signals that the crane is not busy and is free to do a Store or Retrieve Operation.

Figure 3:
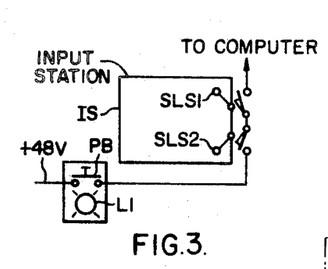
FIG. 3 is a view partly diagrammatic and partly schematic showing a fragment of the circuit of an Input Station which is set when a storage operation is to take place.

Each Input Station IS includes a pair of limit switches SLS1 and SLS2 (FIG. 3) positioned horizontally in the front and the rear of the Station IS and a pushbutton PB connected in series with the limit switches SLS1 and SLS2. After the operator positions a truck TR to be deposited at an Input Station IS he operates the pushbutton PB. Unless both limit switches SLS1 and SLS2 are closed the store operation cannot be started. If both switches are closed a signal lamp L1 is energized to indicate the proper positioning of the truck TR. The limit switches SLS1 and SLS2 are provided to assure that the truck TR is properly deposited for pickup of the Input Station IS. If the truck is improperly deposited, the operator notes that the indicator L1 is not energized and resets the truck.

The apparatus according to this invention also includes a Computer (FIG. 6) and a plurality of Input Consoles (FIG. 1) any of which may be connected to the Computer to control the operation of the cranes CR. Each Console has a plurality of pushbuttons CPB corresponding in number to the number of cranes CR. Each pushbutton CPB is latched in when operated but the latched pushbutton may be unlatched by operation of another of the same pushbuttons CPB. The Input Console also includes a Storage Card Reader for reading the cards which accompany each truck TR to be deposited. The Input Console also has a pair of Indicators CRI and FLT, one to indicate that the card has been properly read and the other to indicate that there is a fault in the reading of the card. Faults other than in reading are indicated by energization of both indicators CRI and FLT.

The apparatus also includes a Retrieval Card Reader, a Tape Impressing Mechanism, a Tape-to-Card Converter, a Tape Reader and a send-receive mechanism called KSR.

The warehousing operations as they are carried out in addition to being entered in the Inventory Core, are also recorded on a tape by the Tape Impressing Mechanism. This Mechanism is enabled by the Output Program at intervals set by the Application Subroutine Program. Retrieval Cards are derived from the tape by the Tape-to-Card Converter. The Retrieval Card Reader reads the Retrieval cards identifying trucks which are to be retrieved.

The Tape Reader serves principally to reestablish the information in the Inventory Core when this Core has by reason of an accident or catastrophe lost its information. At the end of each day, typically during the hour before midnight, the Application Subroutine Program enables the Daily Inventory Log Program. This Program causes a record of the inventory then contained in the Inventory Core to be recorded on a tape by the Tape Impressing Mechanism (see broken lines FIG. 6). At this time the warehouse is not in operation and the Impressing Mechanism is not being used to produce a record of the storage in, and retrieval from, the warehouse. If the warehouse is operated on a 24 hour-a-day basis a separate Impressing Mechanism may be provided for the daily inventory. If later in the new day (following midnight) the Core loses its information, the tape containing the last daily inventory is read into the Inventory Core by the Tape Reader and then the tape containing the records of storage and retrieval for the new day, before the failure occurred, is recorded by the Tape Reader in the Core. The Inventory Core is now up to date.

The KSR is essentially a teletypewriter which enters special mnemonics or symbol signals typically to purge certain retrieve entries or data in the Retrieve Schedule Program or in the Output Program which controls the Tape Impressing Mechanism to enter a demand-retrieve command in the Search Program when material is urgently required, and to enter update data in the Inventory Core (FIG. 6). The KSR has a printer (not shown in detail) for logging the purged retrieve entries and to print the diagnostic messages from the Diagnostic Program.

The Computer is programmed to cooperate with the cranes CR and their control to carry out the warehousing and includes a number of programs to perform this function. Some of these programs are carried out at intervals and for predetermined durations. For this purpose each of the timed programs includes counters for each interval similar to those which count the actuation of switches HLS on VLS by the cranes. The counters are set for counts corresponding to their intervals. In response to a command signal or bid or call these counters decrement or count out. When a counter reaches zero count, it has timed or counted out and is automatically reset for the succeeding timing operation.

The signals for starting the timing out of each of the programs are delivered by an Executive Program (FIG. 6 right). This Program receives synchronizer-interrupt or sync signals, which are delivered from the commercial power supply and occur once for each cycle of the supply (60 sync signals per second). The counter of the Executive Program is actuated by the sync signals which occur at intervals of one-sixtieth second and time the delivery of pulses to the input I of an Application Subroutine Program. Typically, the input pulses may be delivered to the Application Subroutine Program at intervals of 100 milliseconds. In this case the Executive Program delivers one signal to the Application Subroutine Program for every six sync pulses.

The 60-cycle sync pulses are interrupt pulses which interrupt all programs of the Computer on each occurrence. These pulses also serve to reset a clock timer in the Executive Program which provides the time of the day entered with many of the records, for example those of the KSR. The time entered is then reasonably accurate.

The Application Subroutine Program has a plurality of outputs O (all indicated by no arrow labeled O, FIG. 6) which delivers signals, appropriately timed by counters in the Application Subroutine Program, to the Search Program, Input Console Program, Output Program, Retrieve Transfer Program, Diagnostic Program, Daily Log Program and Dead Computer Switch Program (inputs indicated by arrows labeled O). The Application Subroutine Program also delivers timed pulses to the Crane Control Program to time out delay of movement of the cranes CR. If one of these sets of counts reaches zero the Crane Control Program signals the Diagnostic Program that the crane movement in any direction has taken too long. Each of the strokes (FIGS. 4 and 5) of the cranes is timed in this way and excessive time on any stroke, bids or calls or enables the Diagnostic Program.

The main functions performed by the Application Sub-routine Program are as follows:

1. It resets all contact closure outputs CCO's of the Computer for any crane which has carried out a one-bin movement (high speed over part of the path, low speed at the end when the associated one-bin interval count reaches zero.
2. It decrements the Fork/Crane cycle delay count during traverse or fork cycle operations (FIGS. 4 and 5) for each crane. In normal faultless operation these delay counts do not reach zero. Should a delay count reach zero the Crane Control Program "recognizes" that the crane CR in question has taken too long to move horizontally and/or vertically or to carry out its fork cycle and the Diagnostic Program is called or bid.
3. It bids or calls any program level under its control when the program's interval counter reaches zero.
4. It resets the Diagnostic Program contact closure output CCO when the associated interval count reaches zero, typically this interval count has a duration of 5 seconds. The Diagnostic Program initiates the interval count every time a diagnostic message is printed out on the KSR.
5. It sets a signal flag for the Output Program at the start of the 23 hour (11:00p.m.). The Output Program recognizes the flag and causes the Tape Impressing Mechanism to impress the entire bin storage at that time on the Output Tape. This record may then be used on the Tape Reader if there is a breakdown of the Core during the succeeding 24 hours.

In addition to the programs time by the Application Subroutine Program there are a number of others including the Dispatch Pushbutton Programs, the Retrieve Schedule Program, the Input Console Program, the Demand Purge Program, the Demand Retrieval Program, the Update Program and the Update Record Program. The Dispatch Pushbutton Program is initiated by the operator when he sets up a storage operation. The Input Program is initiated when the Tape Reader is initiated after a breakdown of the Inventory Core. The KSR initiates the Demand Purge Program, the Demand Retrieve Program, the Update Program and the Update Record Program.

The Executive Program has outputs P (all indicated by arrow labeled P) which determine the priority in which the Programs bid or called by the Application Subroutine Program are carried out. This priority data are impressed on the Input Console Program, the Search Program, the Output Program, the Load Program, the Dispatch Pushbutton Program, the Diagnostic Program, the Retrieve Schedule Program, the Retrieve Transfer Program, the Daily Inventory Log Program, the Input Program, the Demand Purge Program and the Demand Retrieve Program, the Update Program and the Update Record Program (each indicated by an arrow labeled P) to release the bids or calls of these programs in the appropriate priority order.

The Computer has a plurality of contact control inputs CCI (FIG. 6) 6) on which are impressed signals from the crane and its control, typically the interrupt signals from the switches HLS and VLS. The Computer also has a plurality of contact control outputs from which the command signals are impressed on the crane CR and its control. The CCO contacts are interlocked so that when the cranes are set for manual operation the Computer is positively disconnected from the cranes CR.

FIG. 6 shows a CCI terminal connected to receive address data for bins B from cranes and another CCI terminal connected to receive status data for bins B; this status data indicates that a crane is ready to deposit a load from an upper position (Bin-High) or to pick up a load from a lower position (Bin-Low). At the INT terminal the interrupt signals from the switches HLS and VLS are impressed.

For a more complete understanding of the structure and operation of this invention the functioning of the various programs in the actual use of the apparatus will now be described.

The following paragraphs present in steps the the cooperation of the Programs, and particularly the Crane Control Program, of the Computer and the control and drive mechanisms of the crane. The Crane Control Program which provides for control of each of the cranes CR is typically bid every second. The input signals are impressed on the Computer through contact control inputs CCI and output signals are derived from the Computer through contact control outputs CCO.

Step 1X Computer—
  Calculates the required crane movement and stores the required horizontal or vertical counts. Also initiates the crane movement and then the advance is made to Step 2X.
Step 2X Computer—
  Checks the horizontal and vertical counts for zero. If both counts are not equal to zero, this step 2X recycles. If both counts are equal to zero, the advance is made to Step 3X.
Step 3X Computer—
  Checks the status of the stopped crane at the required bin position. If the status is not correct, the step recycles. If the status is correct, the advance is made to Step 4X.
Step 4X computer—
  Again checks the status of the stopped crane at the required bin location. If the status is not correct, a crane error exists and the diagnostic function of the crane program is entered in the Diagnostic Program. If the status is correct, the fork extension (left or right) is initiated. Then the advance is made to Step 5X.
Step 5X Computer—
  Resets the fork extension function and then the advance is made to Step 6X.
Step 6X Computer—
  Checks the crane status for the full right or left fork extension. If the status is not correct, the step recycles. If the status is correct, the forks hoist or lower is initiated and the advance is made to step 7X.
Step 7X Computer—
  Resets the forks hoist or lower function and the advance is made to Step 8X.
Step 8X Computer—
  Checks the crane status for the bin high or low. If the status is not correct, the step recycles. If the status is correct, the fork centering (left or right) is initiated. Then the advance is made to Step 9X.
Step 9X Computer—
  Resets the fork centering function and then the advance is made to Step 10X.
Step 10X Computer—
  Checks the status of the crane for the forks recentered. If the status is not correct, the step recycles. If the status is correct, the warehouse is updated. The updating is carried out by storing zeros in the Inventory Core in the first pass.

TABLE I

|  | Bit | Steps 1,2,3 | Step 6 | Step 8 | Step 10 | Steps 1,2,3,4 | Step 6 | Step 8 | Step 10 |
|---|---|---|---|---|---|---|---|---|---|
| Column center | 0 | 1 | 1 | 1 | 1 | 1 | 1 | 1 | 1 |
| Bin high (deposit) | 1 | 0 | 0 | 1 | 1 | 1 | 1 | 0 | 0 |
| Bin low (pick-up) | 2 | 1 | 1 | 0 | 0 | 0 | 0 | 1 | 1 |
| Crane power on | 3 | 1 | 1 | 1 | 1 | 1 | 1 | 1 | 1 |
| Forks left | 4 | 0 | 0 | 0 | 0 | 0 | 1 | 1 | 0 |
| Forks right | 5 | 0 | 1 | 1 | 0 | 0 | 0 | 0 | 0 |
| Forks center | 6 | 1 | 0 | 0 | 1 | 1 | 0 | 0 | 1 |
| Overweight | 7 | 0 | 0 | 0 | 0 | 0 | 0 | 0 | 0 |
| Load on forks | 8 | 0 | 0 | 1 | 1 | 1 | 1 | 0 | 0 |
| Full bin left | 9 | E | 0 | 0 | E | E | 0 | 0 | E |
| Full bin right | 10 | E | 0 | 0 | E | E | 0 | 0 | E |
| Oversize | 11 | 0 | 0 | 0 | 0 | 0 | 0 | 0 | 0 |
| Load at input station | 12 | E | E | E | E | E | E | E | E |
| Dispatchers PB | 13 | E | E | E | E | E | E | E | E |

In the above table the following are the status symbols for the control contact input (CCI) of the Computer before the steps at the head of a column are carried out:

0=Open
1=Closed
E=Immaterial whether open or closed.

In the left-hand column "Bin-High" means that the crane is ready to deposit a load by moving down from a higher position (note 1 in Step 8). "Bin Low" means that the crane is ready to pick up a load by moving upwardly (note 1 in steps 1 through 3). The "Overweight" is the overweight of a truck detected when the crane picks up the load; typically the weight of a truck should not exceed 6,000 pounds. The "Oversize" is the oversize of a truck. In the event of "Overweight" or "Oversize" the Diagnostic Program is bid. "Full-Bin Left" and "Full-Bin Right" mean that the bin where a deposit is to take place is full. This is typically detected by interruption by the truck in the bin of a light ray to a photocell. In this case there is also a bid to the Diagnostic Program.

During a storing operation the operator deposits the truck TR on the platform at the Input Station IS of one of the aisles AS. If the load is properly positioned both Limit Switches SLS1 and SLS2 are closed and closes the pushbutton PB. If both Limit Switches SLS1 and SLS2 are closed an indicator L1 is energized indicating that the truck is properly positioned. The Dispatch Pushbutton Program is now entered. All pushbuttons for all aisles AS are scanned and for each pushbutton the presence of an associated truck at an Input Station IS is checked. If a truck is present at an Input Station, an indication (PBPRF Flag) is set and in addition the Load Program is bid or called. The Dispatch Pushbutton Program is turned off after all the pushbuttons have been checked.

The Load Program is entered as the result of the bid or call placed by the Dispatch Pushbutton Program. For any indicator (PBPRF Flag) set the presence of the associated truck at Input Station IS is checked. If the truck at Input Station IS is present a corresponding code bit is set in the Input Console Program. When all PBPRF Flag indicators have been checked the Load Program is turned off.

After a truck TR is set on the Input Station IS and the pushbutton PB at the Input Station has been operated and the indicator L1 at that Station IS has been energized, the operator actuates a pushbutton CPB on the Console corresponding to the crane CR of the aisle AS for which the truck is set. This operation conditions the Input Console Program to operate. The operator next inserts the card corresponding to the truck TR placed on the Input Station IS, into the Storage Card Reader slot. The Storage Card Reader slot has a limit switch (not shown) which is closed when the card is properly positioned to be read. When this limit switch closes, the information on the card and as to the pushbutton is set in the Input Console Program and is compared with the bit which was set from the Load Program when the Dispatch Pushbutton was actuated. The crane Pushbutton CPB on the Console are latched in during this operation. The Input Console Program recognizes the crane number for which the pushbutton CPB is closed. It then determines if the bit from the Load Program was set for this selected crane; and if the bit is correctly set, the card is locked in position (through a CCO). Next, the card is read. The card is provided with two sets of identical impressions covering the truck which is to be stored. If the Storage Card Reader reads identical data from the two identical impressions, the data on the truck to be stored are inserted in the BLOCK table of the Search Program and card-read signal CRI is energized. The data on the card is transmitted to the Input Console Program and the card is released through a CCO so that it may be removed and the latched-in pushbutton CPB is unlatched. If the readings of the two impressions are not identical, the card fault signal FLT is energized and the card-read signal CRI remains deenergized. If there is a lack of correspondence between the data transmitted to the Input Console Program by the pushbutton and card and the bit, both indicators CRI and CFL are energized. Such energization of both signals would occur if the Dispatch Pushbutton had not been actuated or if there were no truck at the Input Station IS or if the incorrect pushbutton CPB for the crane CR which is to pick up the truck TR has been actuated. The pushbuttons CPB are interlocked so that they are unlatched if the operator presses the correct pushbutton when he finds, on seeing CRI and FLT signals that an incorrect button has been pushed.

All Cranes may be operated from any one of a plurality of Input Consoles and the Input Console Program is carried out for any Console which is in use. The Input Console Program is bid or called by a signal from the Application Subroutine Program once each second (arrow O). On each bid, each Input Console is then checked for a storage card present, then for a valid crane selection and for a correct truck number.

If the data is correct the Input Console Program checks the Search Program to insure that another Store command is not already present for the selected crane. Then the code bit indicating the presence of the bid from the Dispatch Pushbutton Program and the Load Program is checked. If the code bit is set and the Card Read light CRI is energized, the truck number is stored in the store table contained in the Search Program. This generates the store command for the selected crane. The store card is then released and typically 5 seconds after the card is removed the Card Read light CRI is turned off. The store command for the truck is now in a table of the Search Program and the truck identified by the command is stored when its turn arrives in the priority scale.

For retrieval of stored material the appropriate cards derived from the Tape-to-Card Converter are inserted in the Retrieve Card Reader. The retrieve data, read by the Reader, from a number of the cards in their order of insertion is transferred by the Retrieve Schedule Program into the Retrieve Schedule Buffer. The Retrieve Schedule Buffer is contained in the Retrieve Schedule Program and consists of a cardtruck table CRDTRK and a cardadd table CRDADD, each including typically 128 words.

Not all of the spaces in the Cardtruck Table, CRDTRK, and the Cardadd Table, CRDADD, are used for inserting retrieval data from the Retrieve Card Reader. Typically of the 128 words in each, 112 are used for inserting data from the Retrieve Card Reader and the other 16 remain open for use in inserting demand retrieve data from the KSR. When the number of cleared CARDTRK and CARDADD locations exceeds the prescribed number (16), cards are read into the table through the Retrieve Card Reader. The card reading continues until the number of cleared locations in the Cardtruck table equals the prescribed number (112). On reading of each card the retrieve truck number is transferred to a cleared location in the Cardtruck (CRDTRK) table. Then the retrieve crane number and the indicated bin address are transferred to the associated location in the Cardadd (CRDADD) table. Now the Retrieve Schedule Buffer has the data necessary for retrieval. When the required number of Cards have been read and the data transferred to the tables the Retrieve Schedule Program is turned off.

Typically two mnemonic entries on the KSR are provided to disable or to enable the Retrieve Card Reader program function. The operator initiates either by:
1. Depressing the Attention Interrupt pushbutton PBAI signaling the Computer that a Console entry is to be made.
2. Typing one of the following formats.
   a. Disable Reader
      RD CR* (Carriage Return)
   b. Enable Reader
      RE CR* (Carriage Return)

The RD operation on the Retrieve Schedule Program is used in situations in which it is necessary to disable the Card Reader where it is necessary to work on it or work on any of the programs or on the apparatus. The Retrieve Card Reader may be enabled by impressing an enabling signal responsive to the indication RE on the KSR.

The Retrieve Transfer Program is bid every 1 second by the Application Subroutine Program and transfers the retrieve data from the Retrieve Schedule Buffer to the retrieve tables, a truck-number table (SRRTBL) and a bin address table; that is, a table for bin aisle and number, (SRRADD). These tables SRRTBL and SRRADD are contained in the Search Program. The Retrieve Transfer Program scans the Retrieve (SRRTBL) table for cleared locations. For each cleared location found, the associated crane number is derived and the Retrieve Schedule Buffer is scanned for that crane number. If the crane number is found, the corresponding truck number is transferred from the CRDTRK table to the SRRTBL and then the location in the CRDTRK table is cleared. Then the corresponding indicated bin address is transferred from the corresponding location in the CRDADD table to the SRRADD table and then that location in the CRDADD tables is cleared. Each time the retrieve data are transferred from the Retrieve Schedule Buffer to the SRRTBL and the SRRADD table, a count (ZROCNT) of the total number of zeros (empty words) in the Retrieve Schedule Buffer is incremental.

When the entire Retrieve (SRRTBL) table has been scanned the Retrieve Transfer Program checks the difference between the actual number of zero locations (ZROCNT) in the Retrieve Schedule Buffer and the predetermined limit number of zeros (16). Typically, there may be 16 words of the 128 available for demand retrieve and the like. If, for example, the actual number of zeros exceeds the limit, the difference is the required number of cards that must be read; for example, if there are found to be 18 zeros in the check, two cards are to be read. This difference is stored in the Retrieve Schedule Program and that Program is bid. Then the Retrieve Transfer Program is turned off.

The Search Program provides the basic decisionmaking function for the actual operations of the cranes CR. It accommodates all 15 cranes CR and is bid or called every 1 second by the Application Subroutine Program.

On each bid the Search Program goes through the following sequence.

1. It determines, for each crane CR in its turn, if it is busy. If the crane is busy no further move is made during this scan as to this crane. A command for this crane if any is present, is handled during a later scan.
2. It determines if a not-busy crane is on automatic operation; if it is on manual operation (CCO open), the Search Program takes no further action on this crane; a command for this crane is handled during a later scan.
3. If the cranes are on automatic and at the Home position, the Search Program scans the BLOCK table for a truck to be stored.
4. If there is a store command for this crane in BLOCK, the Search Program initiates the search to carry out the storage.
5. If there is no store command for this crane in BLOCK the Search Program scans the SRRTBL table. If there is a retrieve command in this table the Search Program initiates the search to carry out the retrieve.
6. If the crane is on automatic and away from Home, the SRRTBL table is scanned first.
7. If there is a retrieve command for this crane the Search Program initiates the search to carry it out.
8. If there is no retrieve command for this crane, the BLOCK table is scanned and if there is a load for this crane the Search Program initiates the search to carry it out.
9. If there is no store or retrieve for any crane, its position is checked.
10. Typically, if the crane is beyond the 19th bin B from home of the aisle AS horizontally, it is returned to the 10th bin.
11. Typically if the crane is beyond the fourth bin vertically, it is returned to the fourth bin.
12. On the initiation of a store or retrieval operation by a crane, the Search Program sets the crane busy; that is, sets a flag showing the crane is busy. (See Crane Control Program below.)

For a usual store or retrieve operation the Search Program searches that portion of the Inventory Core assigned to the crane found not busy (see steps 4, 5, 6, 7). For a store operation the search is made for the nearest empty bin to the Home position. For a retrieve operation the search is made for the bin which contains the truck number. When the bin is found the Search Program transfers the truck number, store or retrieve indication and bin address to the Crane Control Program. It then clears the original store or retrieve command and initiates the crane operation.

For the crane-repositioning operation the Search Program checks a code flat to see if the crane has already been positioned. If not, the code flag is set and the crane operation is initiated.

The Search Program includes as one of its integral parts the Demand Search. It is entered, after the normal Search Program has processed all 15 cranes, during the periodic 1-second intervals if any of the following condition occur:

1. On a retrieve command—if the number of the truck to be retrieved is not found in the indicated crane area of the bin storage.
2. On a retrieve command—if the truck number is found in the indicated crane area but not in the indicated bin.
3. On a demand retrieve command—the truck number is in this case stored by the manual programmer's console entry on the KSR.

When entered or bid, the Demand Search initiates the search of the entire bin storage for a truck number stored by one of the initiating conditions. If the truck number is not found a diagnostic message is initiated by a bid to the Diagnostic Program. If the truck number is found a check is made to determine if it was stored by the Demand Retrieve. If so, a diagnostic message is initiated by a bid to the Diagnostic Program. For any other found truck number a diagnostic message is initiated by a bid to the Diagnostic Program. Only one truck number is accommodated each time the Demand Search is entered. This is to insure that the periodic search of all 15 cranes is not delayed for an extended period of time.

The Crane Control Program is bid every 1 second by the Application Subroutine Program and provides for the control of each of the cranes (through CCO's). A crane operation can be accomplished only if:

1. The Automatic flag is set—This indicates that the crane is in the automatic programming (CCO's set for automatic) mode of operation.
2. The fork/crane delay is not equal to zero—This indicates that the crane has not taken more than the allotted time to complete a movement of a fork cycle (FIGS. 4 and 5).
3. The CRNERD word is cleared from the Diagnostic Program—This indicates that the Diagnostic Program is not set up, or ready to initiate a crane diagnostic message.
4. The Outape flag is cleared—This indicates that the Output Program is not ready to punch, or in the process of, impressing the information for a previous operation on the output tape. This condition is necessary because it is essential to clear an operation of a crane from the table of the Crane Control Program before data on a new operation is inserted, otherwise part of the new operation is impressed on the tape.
5. The crane is not set busy. (See Item 12 Search Program above.)

Each crane performs first a load pickup and then a load deposit function for either a store or a retrieve operation. The expression "pickup" here means the operation of the crane at the point where it engages the load. This is the same whether the crane is at a full bin for a retrieval or at the Input Station IS. In either event the crane must first pick up the load and then deposit it at its destination.

If the crane Control Program finds that a crane is set busy by the Search Program the required operation is accomplished by making two passes through 10 sequence steps. The first pass provides the truck pickup function and upon completion clears the pickup location in the Inventory Core. The second pass provides the truck deposit function and upon completion stores the truck number in the deposit location in the Inventory Core, sets the Outape flag and bids the Output Program. The crane is set not busy but is not free for another operation until the tape impressing of the information for the operation just completed is completed by the Output Program.

The Output Program is bid every 1 second by the Application Subroutine Program The OUtput Program performs the following functions.
1. Impresses on the Output Tape the information for every successful store or retrieve crane operation.
2. Impresses on the Output Tape the information for every store or retrieve manual update of the Inventory Core.
3. Sets up for the daily impression (usually at 11:00 p.m. and m.) of the entire Bin Storage by the Executive Program.

For the daily impression of the Output Tape is impressed typically in the standard binary format. For the crane and update records the Tape is impressed typically in the IBM 8 channel format to be compatible with the Tape-To-Card Converter which is typically an IBM 046.

The following table II shows the tape format for the records.

TABLE II

| S or R (1) | CRN. NO. (2) | L or R (1) | HORZ. ADDR (2) | VERT. ADDR (2) | TRUCK NO. (5) | CHECK SUM (3) | E L (1) |
|---|---|---|---|---|---|---|---|

Upon entry the Output Program checks the 23rd hour flag. If this flag is set the Core limits of Bin Storage in Inventory Core are stored and the Program transfers into the Executive Program. The Executive Program actually bids the impressing of the entire warehouse Bin Storage. If the 23rd hour flag is not set the Output Program then checks the Outtape flag associated with each crane. If an Outtape flag is set it indicates that the crane has successfully completed an operation. The record is impressed and when completed the Outape flag is reset. (This frees the crane for another operation.) When all the Outtape flags have been scanned the program then checks for any manual update entry which may have been made. If an entry has been made, the update record (same format as a normal crane operation record) is impressed on the tape. When the impressing of this record is complete the program is turned off. The Tape Impressing Mechanism may be disabled through the Output Program by typing signal PD CR* on the KSR and may be enabled by similarly typing PE CR*.

The Diagnostic Program is bid every 15 seconds by the Application Subroutine Program and logs required diagnostic messages on the KSR. The following are the messages logged.
1. Demand retrieve entry (this log is not considered a true diagnostic). The message indicates where the specified truck is stored in the Inventory Core.
2. Errors detected by the Search Program due to a truck number being found in other than the indicated bin location.
3. A crane CR returning to the Automatic programming mode of operation.
4. A truck number which the Search Program could not find in the entire Inventory Core.
5. Crane Errors due to instantaneous status failures or to the crane CR taking excessive time in its operations (FIGS. 4 and 5).

Each time a diagnostic message is initiated (with the exception of a Demand Retrieve) a diagnostic indicator CCO is set and a 5 second delay initiated. After all possible message indicators have been checked the Diagnostic Program is turned off.

The Update Program provides a means to update the Inventory Core by manually entering the data through the KSR. The operator initiates the Update Program by:
1. Depressing the Attention Interrupt pushbutton PBAI signaling the Computer that a Programmer's Console entry is to be made.
2. Typing one of the following typical formats:
    Store Update—SU, CR* CRANE NO, L/R, HOR., VERT., TRK NBR, CR*
    Retrieve Update—RU, CR* CRANE NO., L/R, HOR., VERT., TRK NO., CR*

For the retrieve update, the specified bin location is cleared. For the store update, the truck number is stored in the specified bin location. For either entry the update information is punched on the Output Tape in the same format as for a normal crane store or retrieve operation. This keeps the Output Tape abreast of the warehouse inventory. Another Update entry is not accepted until the Output Tape impressing is completed for the previous Update Entry.

The Demand Retrieve Program provides a means of entering through the KSR a Retrieve command for a specified truck directly in the Search Program. the operator initiates this program by:
1. Depressing the Attention Interrupt pushbutton PBA1 signaling the Computer that a Programmer's Console entry is to be made.
2. Typing the following typical format—DR, CR*, TRK NBR., CR*

Immediately after the entry is made a verification message is printed by the Diagnostic Program. This message indicates whether or not the truck is stored in the warehouse. If the truck is located the message specifies the associated crane and the bin address. Between the original entry and the completion of the verification message, no other Demand Retrieve entry is accepted.

When the truck is found in storage the retrieve command is generated for the associated crane by storing the information in the Retrieve Schedule Buffer.

The Demand Purge Program is used in situations in which a crane has become disabled and it is necessary to work on the crane for an extended time interval. In this case it is necessary to purge the Retrieve Data for this crane from the CRDTRK Table and the CRDADD Table of the Retrieve Schedule Buffer.

The Search Program and the Crane Control Program operate to set crane operations in the priority in which data are recorded in the Retrieve Schedule Buffer unless there is other priority operations ahead of the data. If a crane is disabled and the Retrievals for this crane in the Retrieve Schedule Buffer are not removed, this data in the tables in the Retrieve Schedule Buffer then gradually advance in priority until the Search Program and the Crane Control Program operate futilely on this data alone and prevent the normal operation of the warehousing system for the other cranes. To preclude a shutdown of this type the data as to a crane which is for a time disabled are purged entirely from the tables of the Retrieve Schedule Buffer.

The Demand Purge Program provides a means of clearing through the KSR the Retrieve Schedule Buffer of all entries for a specified crane. The operator initiates the Demand Purge Program by:
1. Depressing the Attention Interrupt pushbutton PBAI signaling the Computer that a Programmer's Console entry is to be made.
2. Typing the following typical format in the KSR: DP, CR*, CRN NBR, CR*.

Immediately after this typed entry the Demand Purge Program causes a carriage return and the crane number to be printed. This is a verification to the operator to allow him to check the specified crane. The operator then types a carriage return which causes the program to scan the Retrieve Schedule Buffer for entries for the specified crane. Each entry found causes a message to be printed on the KSR in the following format:
DPURG, CRN NBR, TRK NBR, IND L/R, HOR, VERT.

Each entry that initiated a message also causes the clearing of that entry data in the Retrieve Schedule Buffer. The program repeats this operation until all entries for the specified crane have been logged and then it is turned off for the following reason.

The input Program provides the reading of the Output Tape through the Tape Reader and updates the Inventory Core according to the information read from the Output Tape.

The operator initiates the Tape reading by:
1. Placing the Output Tape in the Tape Reader (usually a high-speed reader).
2. Setting the tape-brake lever.
3. Depressing the Attention Interrupt pushbutton PBAI signaling the Computer that a Programmer's Console entry is to be made.
4. Typing the following typical format: IL CR*.

The tape is read in and the updating of Inventory Core completed for each record The Tape continues to be read in until the end of the tape is under the tape-brake lever causing a parity-error stop. If during the tape reading the Input Program detects an error an ERR message is printed and the Tape stops in the faulty record. The operator must then manually advance the tape to the beginning of the next record and repeat the entire initiation procedure. This allows the operator to mark the faulty record for later examination.

The Power Supply Failure and Restart Program is an interrupt Subroutine which preserves the registers and stops the Computer when the Power Failure Interrupt is received and restarts the main subsystems when the Power Supply Voltage returns to normal. The specific components which are restarted are the KSR and the CCO's. The CCI scan is restarted automatically by the Executive Synchronizer Interrupt Subroutine. There are a plurality of registers which are associated with the memory core and from which certain information in this core is transferred. While the core is composed of magnetic elements which remain in their last-magnetized condition on the interrupt of power, the registers are composed of flip-flops which may be set in a different setting after the power is restored than they were before the power was interrupted.

The Power Supply Failure and Restart Program includes facilities for detecting any decrease in the voltage which may anticipate a power failure. On detecting this decrease in voltage, the Power Supply Failure and Restart Program immediately transfers the data from the registers back into the core. When the system is restarted this data can be transferred back to the registers and the operation may proceed normally.

The Restart of the KSR and CCO scan is effected by sending dummy signals. These signals have the effect of asking the KSR and CCO if any messages or if any action was in progress when the power failed.

Typically the Computer includes a main stack or main frame to which are added extended core stacks. The main frame and extended core stacks usually have separate power-failure interrupts which feed into the Power Supply Failure and Restart Program. When a main-frame power-failure interrupt occurs the Power Supply Failure and Restart Program is directly enabled to preserve the registers and stop the Computer. When the Computer is later restarted this Program performs the following operations in the sequence listed:

a. Outputs a turn-on character to the KSR which was turned on at the power-failure instant;
b. Stores ignore instructions (CLJ O, I) in all interrupt locations (except the power-failure interrupt location) and loops for approximately 500 milliseconds with interrupt lockout cleared to allow waiting interrupts to be ignored;
c. Resets interrupt lockout and restores I instructions to the interrupt locations;
d. Reinstates the software interrupt queue buffers;
e. Forces an interrupt to occur on the KSR if it was logging at power failure time by outputting a turn on character;
f. Forces a CCO interrupt to occur if the CCO scan was active by outputting to a valid CCO address (set channel) with the accumulator equal to zero. (CCO not in use).

When an additional interrupt is received for any extended core stack, a check is made to determine if the Power Failure And Restart Program is already in operation. If this Program is in operation, this additional interrupt is ignored. If the Program is not in operation the Program preserves registers and stops the Computer. When the Computer is restarted, the Program performs the same as outlined for the main-frame power-failure restart.

The Dead Computer Switch Program verifies that certain basic functions are operating as expected. It checks for CCO failure, for CCI failure, for Computer stoppage, and for programming loops in which interrupt lockout is maintained for lengthy periods of time. If any of the above maloperations occurs, the dead computer relay (not shown) operates causing all cranes to be switched to the Manual mode of operation.

The hardware required for this Program includes one contact closure output (CCO) tied to one contact closure input (CCI) and the dead computer relay which opens the crane circuits whenever the contact output fails to change state within a certain time period.

Essentially the dead-computer relay includes a pair of coils provided with delay means such as capacitor-resistor networks, for example, so that if the power is disconnected from the relay the relay remains actuated for a time interval for example, 1 second. These coils of the relays are connected to a CCO in such a way that the energizing current through the coils is switched back and forth for example once every second. Each switching is produced by a feedback to a CCI which signals the Computer to cause the switching. If the Computer is not in operation the switching does not occur. So long as the switching occurs periodically the contacts operated by both coils remain connected. These contacts are connected in series with a control mechanism for all of the cranes and so long as they are closed the cranes CR can operate. If the Computer should fail the feedback to the CCI does not produce an actuation of the corresponding CCO and one or the other of the coils remains deenergized for longer than the time during which it remains closed. This contact opens and disables the cranes CR until a correction is effected.

The Dead Computer Switch Program is bid every 1 second and alternately sets and resets the contact-closure output with respect to the dead-computer relay. After an error is detected, the switching of the contact outputs restarts after a time delay, so that a sequence of CCI failures causes the dead-computer relay to be activated intermittently.

If the Dead Computer Switch Program is not permitted to run because the Computer is stopped or in a programming loop, the contact outputs are not switched and the dead-computer relay is actuated for a continuous period. In contrast to the prior art apparatus described in the introductory part of this application, the crane control mechanisms are commanded or controlled in accordance with this invention by the CCO's through the computer. The Computer is programmed to cause the cranes to carry out a selected series of steps. If a more suitable series of steps is conceived or if the steps do not apply to a particular large-scale warehousing operation the Computer can be reprogrammed without any rewiring to achieve the desired change.

While a preferred embodiment of this invention has been disclosed herein many modifications thereof are feasible. This invention then is not to be restricted except insofar as is necessitated by the spirit of the prior art.

We claim as our invention:

1. The method of storing and retrieving widely different materials in a warehouse, having a plurality of bins, and storing means for storing and retrieving said materials in and from said bins, with apparatus including control computer means for controlling the movement and operation of said storing means, said computer means having a memory, said memory including inventory words for storing an inventory of the materials stored in said warehouse, and also including programming words for programming the storage of material in, or the retrieval of material from, said warehouse, said programming words including monitoring-word means for monitoring the storing of material in, or the retrieval of material from, said warehouse and a Diagnostic Program for receiving a report of a malfunction of a storage operation of said storing means and/or said warehouse, the said apparatus also including printing means actuable by said Diagnostic Program for indicating the malfunction and the location of the malfunctioning storing means, and/or the location of the malfunction in the warehouse, said computer means including input and output electrical terminals and being mechanically isolated from the mechanical functioning of said storing means but being electrically connected to said storing means through said input and output control terminals, the said method comprising storing in said inventory words of said memory a storage inventory consisting of a separate item of data for each of said bins, said item identifying the material, if any, stored in said last-named bin, or indicating that said last-named bin is empty, and also identifying the address of each bin, automatically generating a mechanical operation to cause, selected material to be retrieved from a bin where it is stored or to cause material to be stored in an empty bin, responsive to a selective command impressed on the programming words of said computer means, also responsive to said command causing the monitoring-word means of said computer means to monitor the carrying out of said operation to provide intelligence of its completion, if it is satisfactorily completed, or, in the event of a malfunction of the operation of said storing means and/or warehouse, to bid said Diagnostic Program as to said malfunction and to actuate said printing means for printing the malfunction and location of the malfunction storing means and/or the location of the malfunction in the warehouse, whereby said selected material is ultimately stored or material is retrieved or said Diagnostic Program is bid, and after such retrieval or storage, if any, updating the data in said memory to record said retrieval or storage.

2. The method of claim 1 wherein the apparatus includes a record and record impressing means and the programming words cause the impressing by the recording means on the record a recording of each retrieval and/or storage.

3. The method of claim 2 wherein the apparatus includes a record-to-card converter for deriving punchcards from the record and also includes retrieve-card-reading means and wherein the programming words include words responsive to the reading of the cards, and wherein the said method includes the step of selectively automatically carrying out a retrieval operation, responsive to the command on a card, by the said programming words which are responsive to the reading of said last-named card.

4. The method of claim 3 wherein the programming words include a Retrieve-Schedule Program and a Retrieve-Schedule Buffer and the data on a predetermined number of punchcards are continuously transferred by the programming words from said Retrieve-Schedule Program to, and maintained in, said Retrieve-Schedule Buffer and the programming words include a Retrieve-Transfer Program, and wherein the said method includes the steps of transferring said data in said Buffer, on each of said predetermined number of cards in its turn, into retrieval-causing relationship with selected bins, by operation of said Retrieve-Transfer Program, and replacing the data on each card that has caused a retrieval by data from a new card derived from said Retrieve-Schedule Program.

5. The method of claim 4 wherein the apparatus includes means, responsive to the Diagnostic Program, for disabling the storing means on the occurrence of a malfunction of any storing means, the said method including the step of purging the data corresponding to the disabled storing means from the Retrieve-Schedule Buffer.

6. The method of claim 3 wherein the programming words include a Retrieve-Schedule Program and a Retrieve-Schedule Buffer and a Search Program and wherein the method includes the steps of continuously transferring the data on a first predetermined number of punchcards from the Retrieve-Schedule Program to, and maintaining said data in, said Retrieve-Schedule Buffer, maintaining the data on a second predetermined number of different punchcards in said Search Program, periodically scanning the said data in said table by said Search Program, responsive to the data on certain of said last-named cards, causing the programming words of the computer means automatically to cause retrieval of selected material from the bins as identified by the data on each of said last-named cards, and after data corresponding to a card of said last-named causes selected material to be retrieved, replacing said last-named data in said Search Program by data from another card in said Buffer.

7. The method of claim 1 wherein the bins are disposed in sets and the storing means includes a crane associated with each set and wherein, by operation of the programming words of the computer, the cranes are moved to carry out a storage or retrieval operation in a minimum of time by varying the speed of movement of each crane during such operation and by selective control of the cranes.

8. The method of claim 7 wherein each crane has a home position near a region in which material is deposited for storage or material is removed after retrieval, the said method including the steps of maintaining said last-named crane set away from said home position, near a bin in which a first storage operation has been carried out after said crane is actuated by the programming words of the computer means to perform said first storage operation, in a bin displaced less than a predetermined number of bins from said home position, and, responsive to a succeeding command of the programming words of the computer means to carry out a second storage operation, causing said crane to carry out said second storage operation.

9. The method of claim 8 wherein, on receipt both of a storage command and a retrieval command within a short interval of time, the crane away from the home position is actuated by the programming words of the computer means to carry out the retrieval command prior to the storage command.

10. The method of claim 7 wherein each crane has a home position near a region where material is deposited for storage or material is removed after retrieval, the said method including the step of returning, by operation of the programming words of the computer means, a crane to a position displaced a predetermined number of bins from said home position when, after said storage operation, said crane is displaced more than said predetermined number of bins from its home position.

11. The method of claim 1 wherein the apparatus includes a record and recording means and the computer means has programming words for causing said recording means to impress intelligence on said record, and wherein the intelligence of each automatic storage or retrieval operation is impressed by operation of the recording means on said record categorically in correspondence with the location of materials in the bins, the said method including the novelty that the intelligence of material to be deposited in a bin is recorded as in the bin only after the said material has been deposited in said bin, and the record of material retrieved from a bin is recorded as out of said last-named bin as soon as it is actually removed from the bin and when it is adjacent said last-named bin.

12. The method of claim 1 wherein the computer means includes words for carrying out timing the said method including the novelty that the monitoring words of the computer means monitors a storing or retrieval operation, by causing the timing words to time out a time interval during which said operation is to be completed, and, on the elapse of said time interval without completion of said operation, bids the Diagnostic Program of the occurrence of a maloperation.

13. The method of claim 1 wherein the storing means carries out a storage or a retrieval operation by going through a series of mechanical operational steps and wherein the monitoring words of the computer means is caused to monitor each successive step of the storage or retrieval operation in its turn and wherein on occurrence of a maloperation in any step the Diagnostic Program is bid.

14. The method of claim 13 wherein the computer means includes words for carrying out timing and monitoring-word means of the computer means causes the timing words to time out a time interval for each step and on the timing out of said interval before completion of said last-named step the Diagnostic Program is bid.